(12) United States Patent
Sato

(10) Patent No.: US 6,452,730 B2
(45) Date of Patent: Sep. 17, 2002

(54) ZOOM LENS SYSTEM

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 34 days.

(21) Appl. No.: 09/725,807

(22) Filed: Nov. 30, 2000

(30) Foreign Application Priority Data

Dec. 2, 1999 (JP) .............................. 11-343705
Nov. 15, 2000 (JP) ........................ 2000-348664

(51) Int. Cl.⁷ ............................................. G02B 15/14
(52) U.S. Cl. .................... 359/682; 359/680; 359/691
(58) Field of Search ................... 359/680, 682, 359/691

(56) References Cited

U.S. PATENT DOCUMENTS 4,770,509 A * 9/1988 Hayashi et al. ............. 359/682

FOREIGN PATENT DOCUMENTS

| JP | 56-43619 | 4/1981 |
| JP | 57-20713 | 2/1982 |
| JP | 1-239516 | 9/1989 |

* cited by examiner

*Primary Examiner*—Loha Ben
*Assistant Examiner*—David N. Spector
(74) *Attorney, Agent, or Firm*—Miles & Stockbridge P.C.

(57) ABSTRACT

The object of the present invention is to provide a zoom lens system being extremely reduced size such as a standard single focal length lens, having very few number of lens elements, being ultimately reduced cost, having a zoom ratio about 2.2, and also having high optical performance without using any aspherical surface. The zoom lens system has, in order from an object side, a first lens group G1 having a negative refractive power and a second lens group G2 having a positive refractive power, and performs zooming by changing an air space between the first lens group G1 and the second lens group G2. The first lens group comprises, in order from the object side, a negative lens group $L_n$ consisting of one or two negative lens elements and a positive lens $L_{12}$ having a convex surface facing to the object side. All surfaces consisting of the first lens group G1 are spherical or plane surfaces. Predetermined conditional expressions are satisfied.

18 Claims, 12 Drawing Sheets

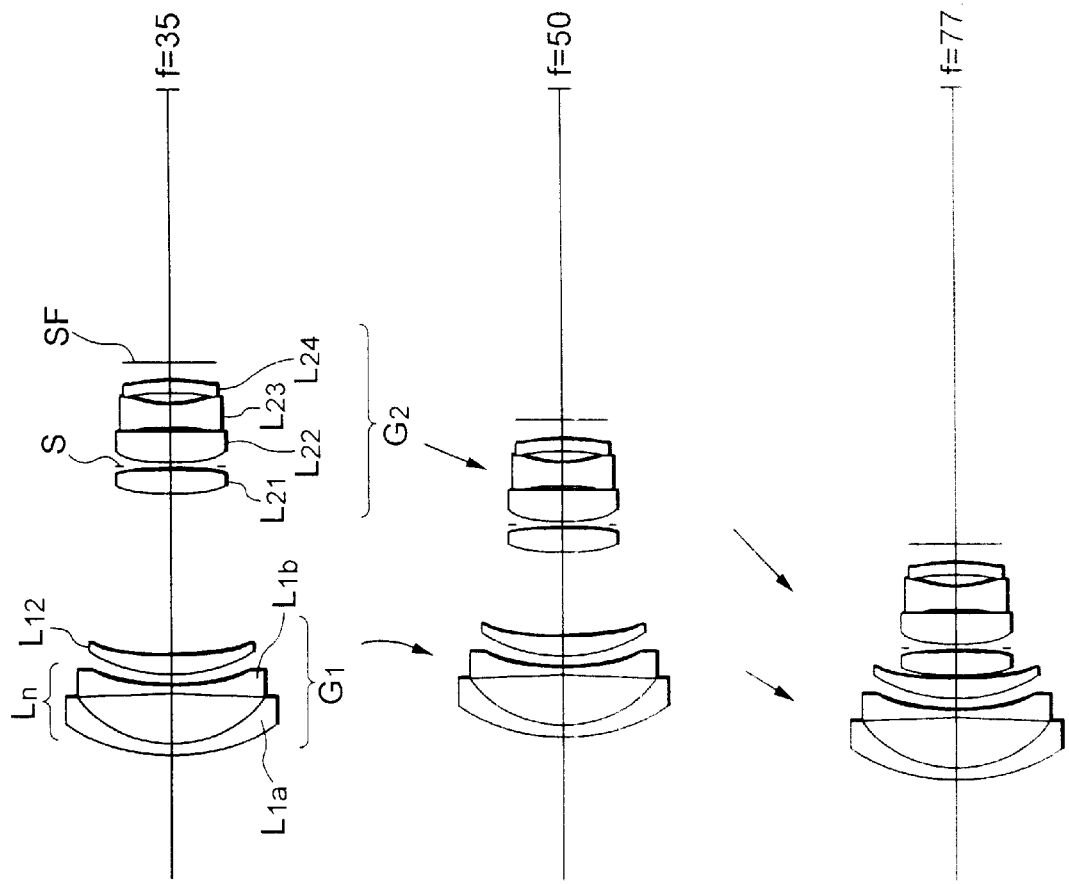

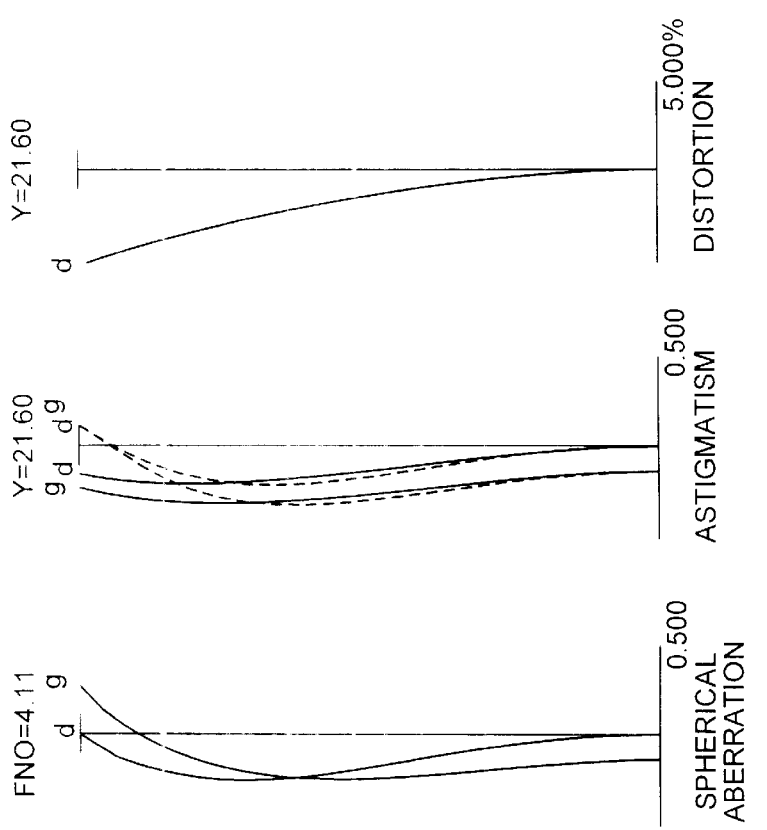

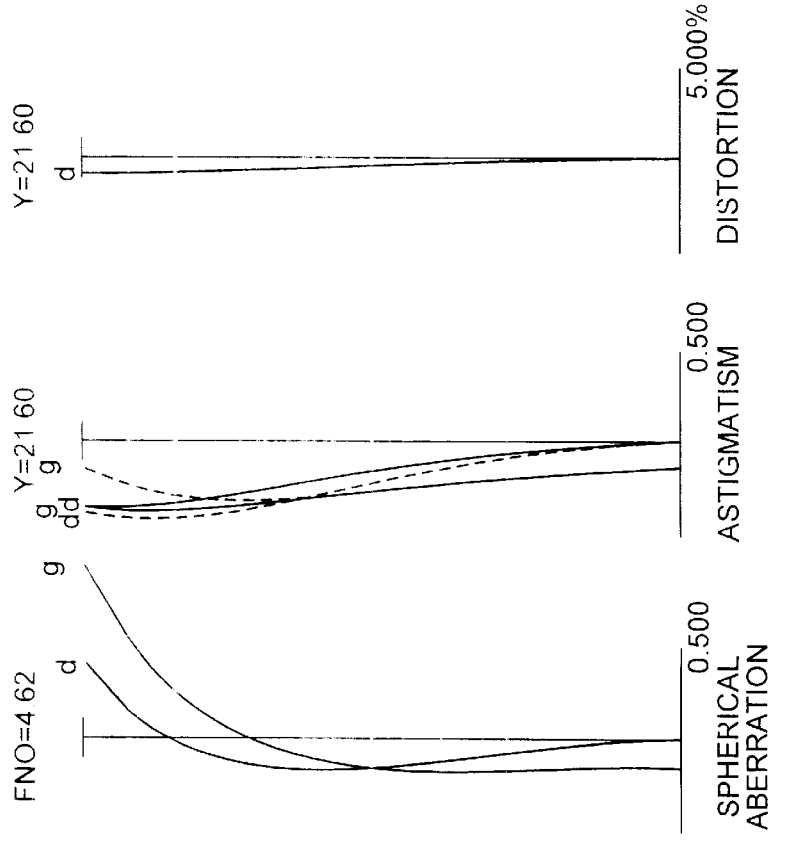

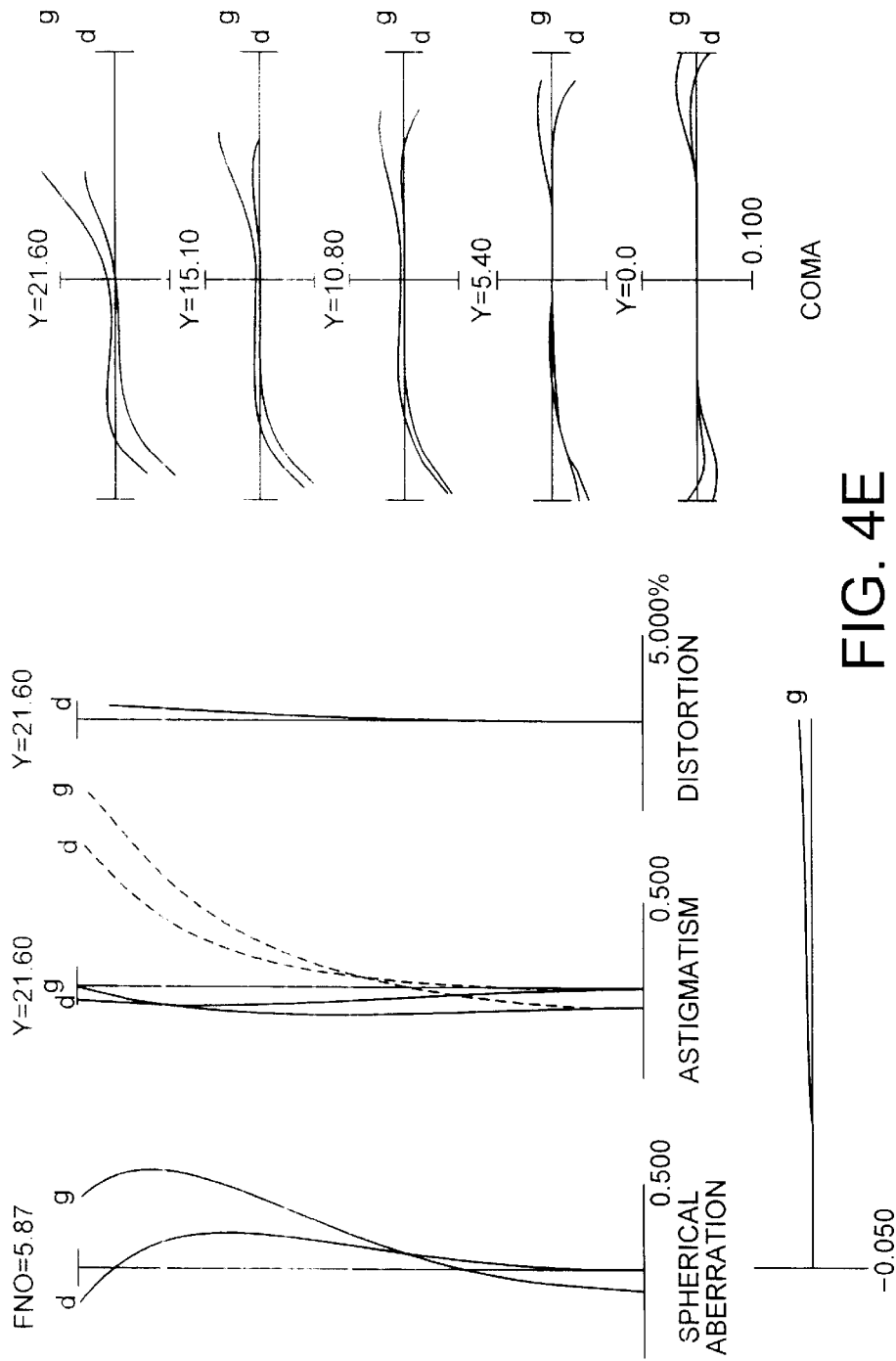

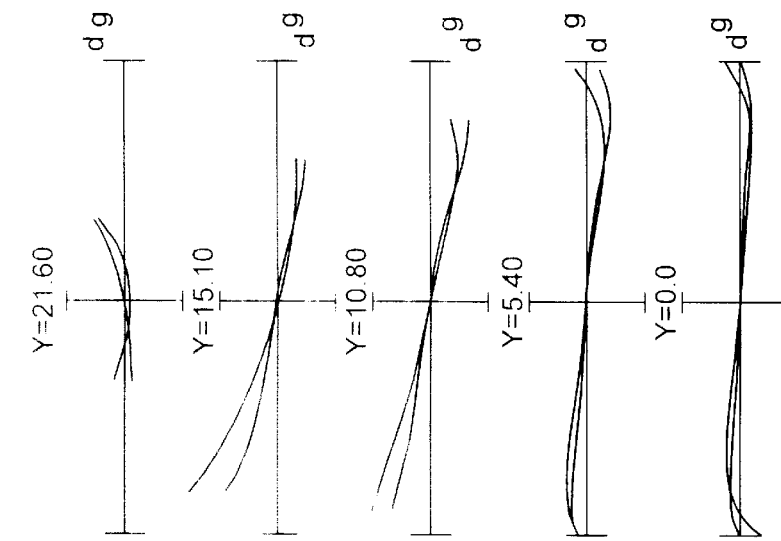
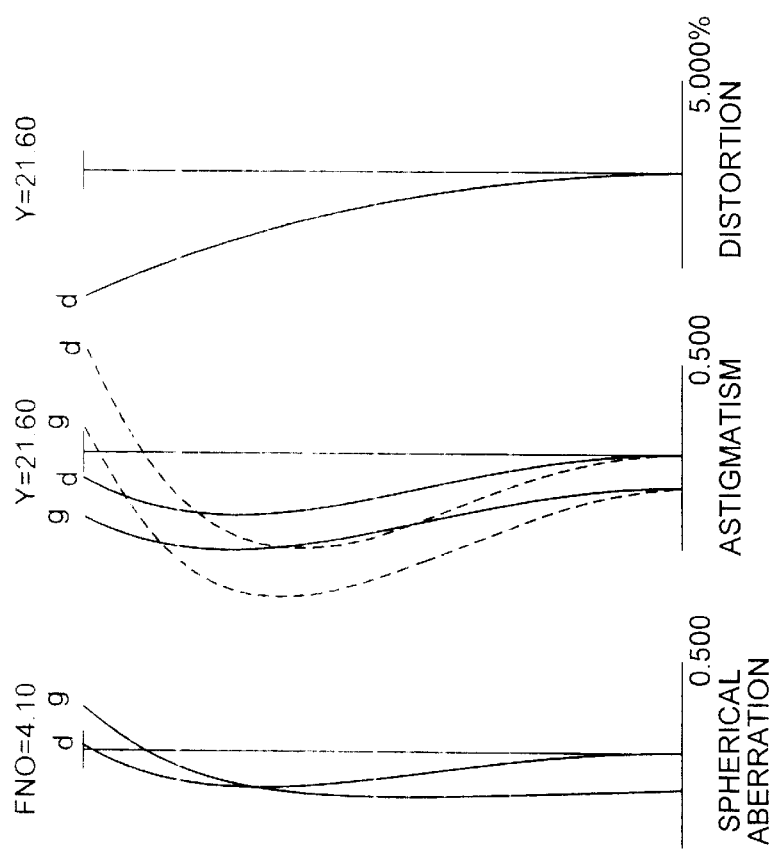

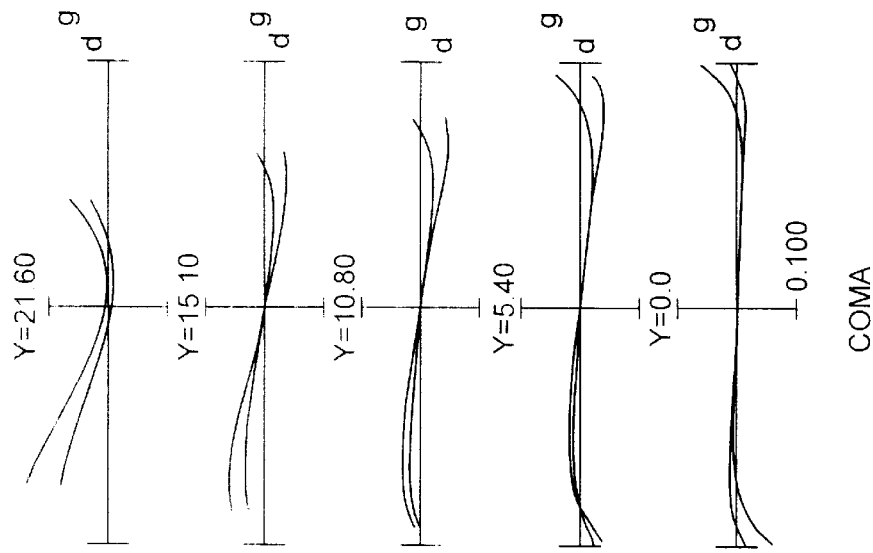
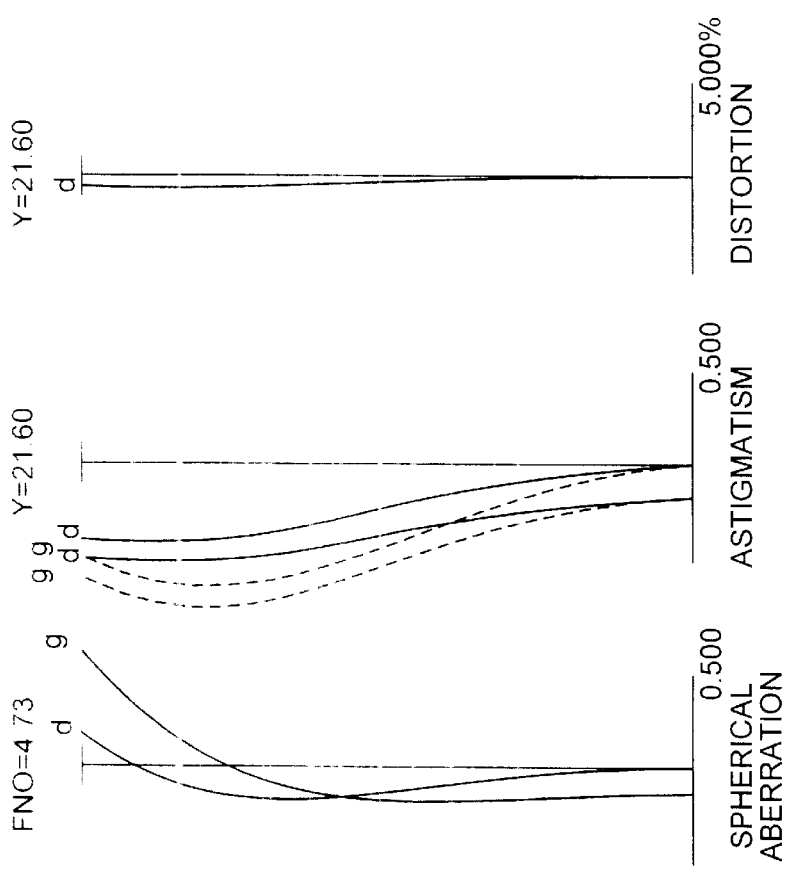

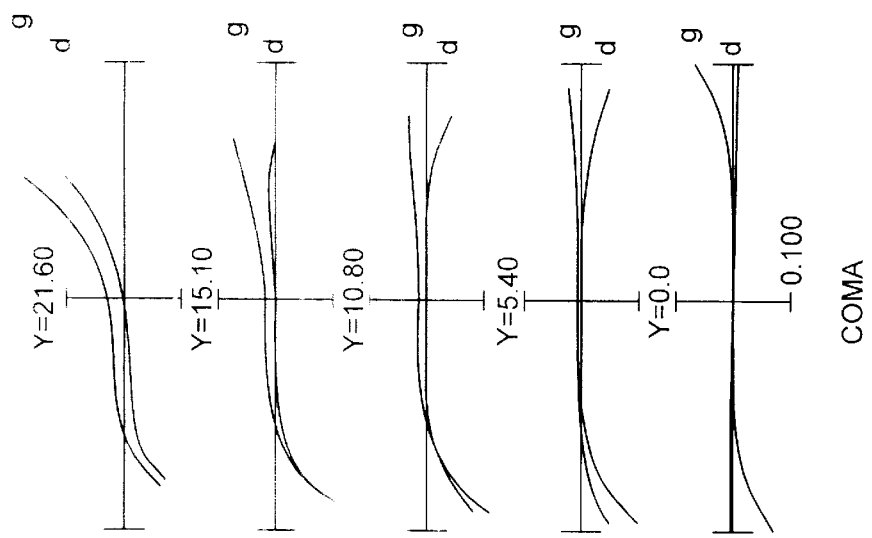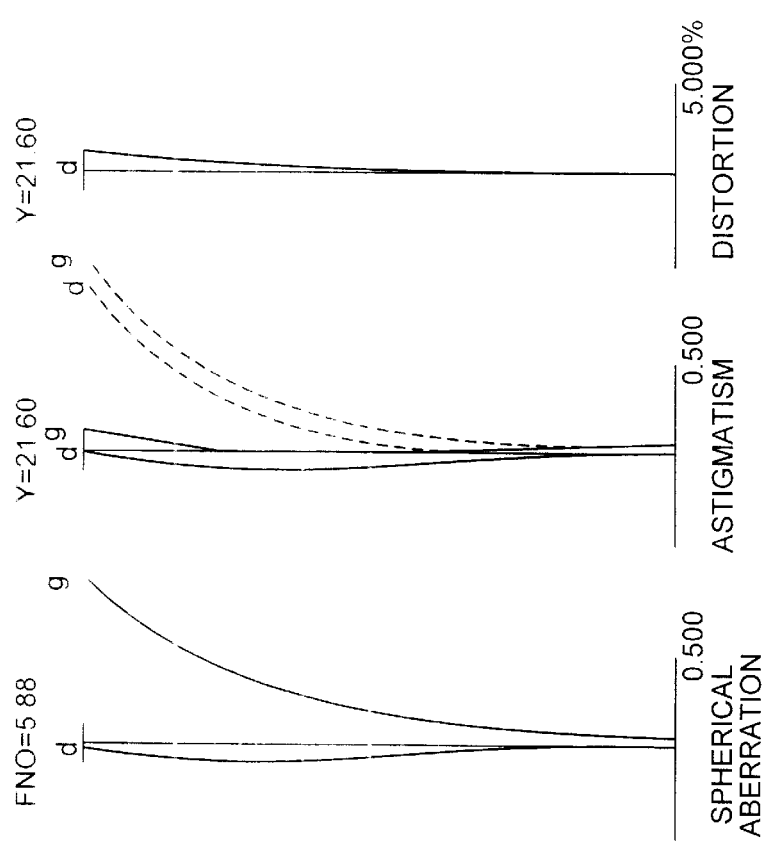

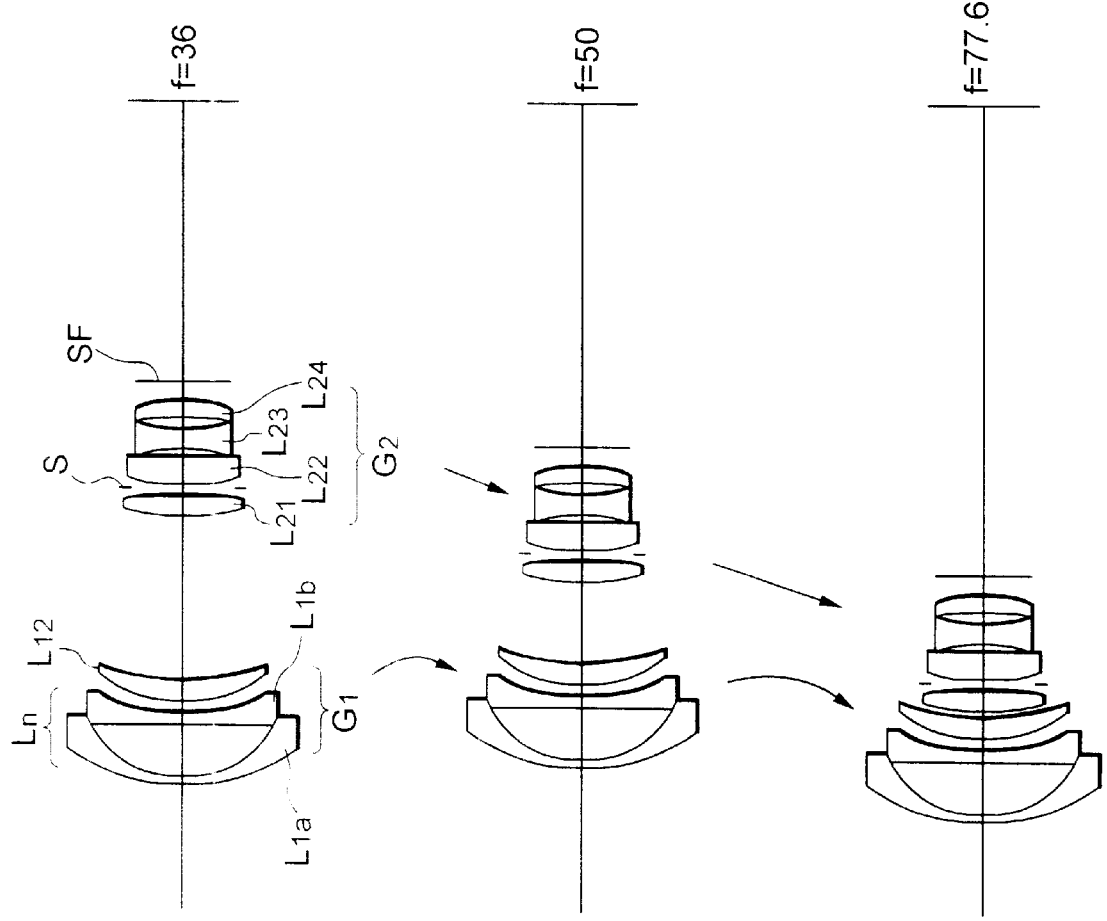

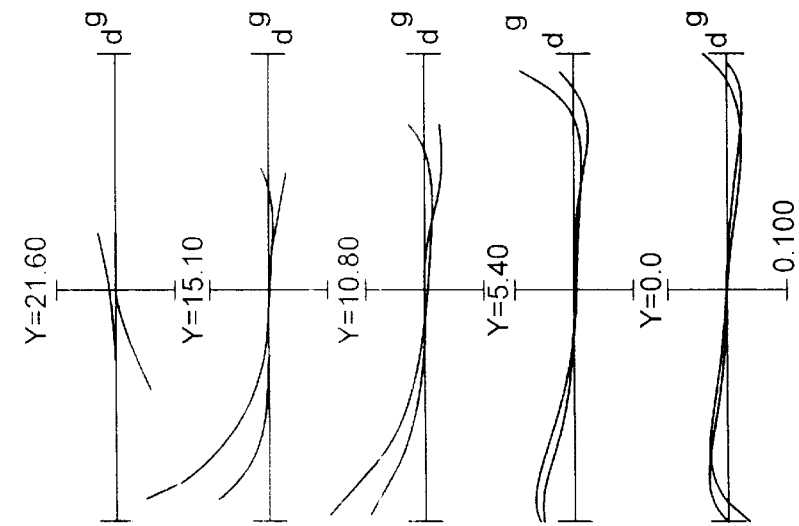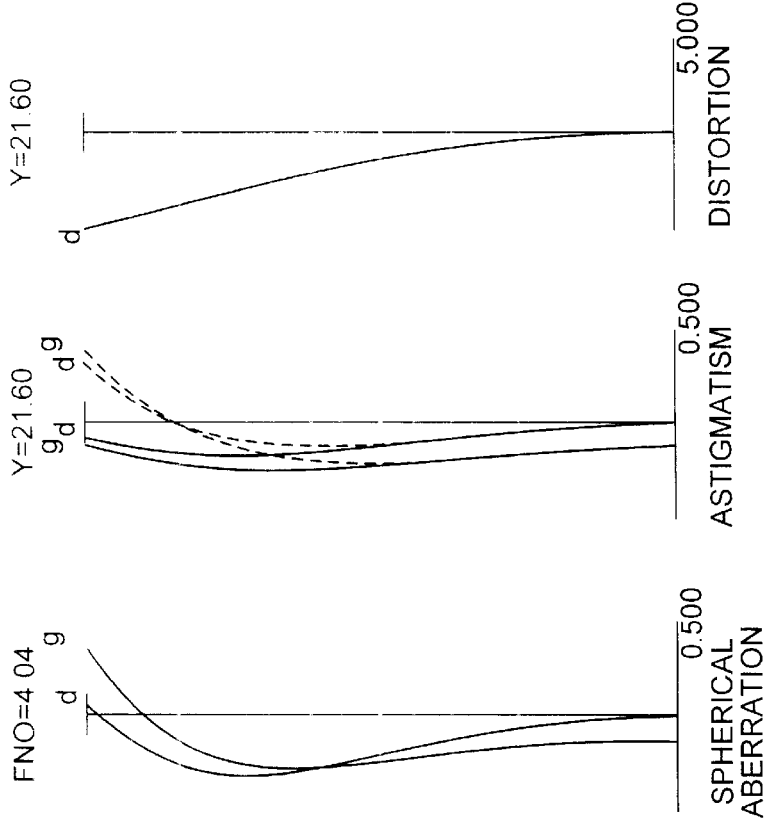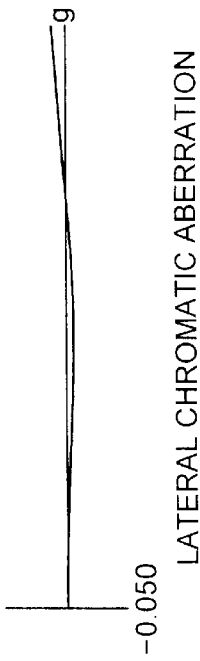

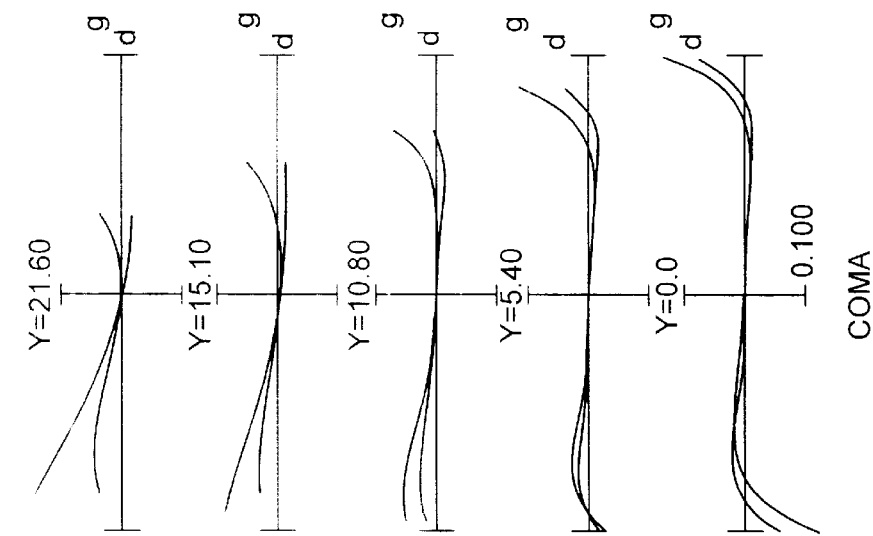
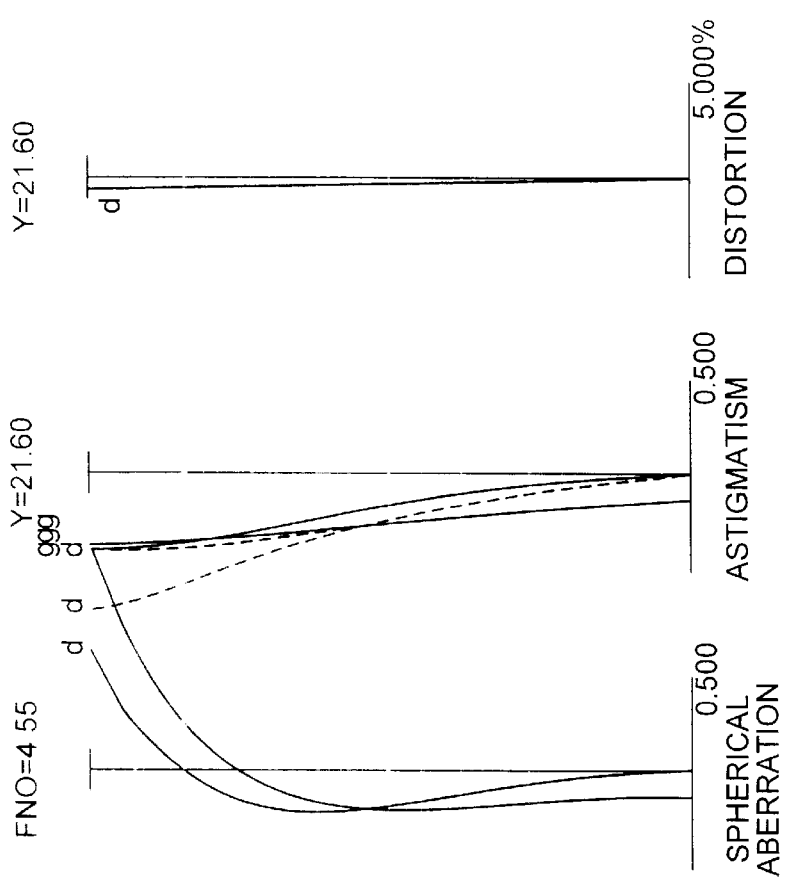
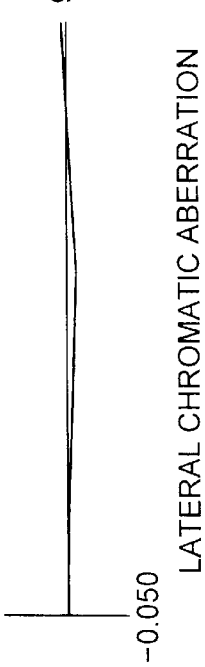

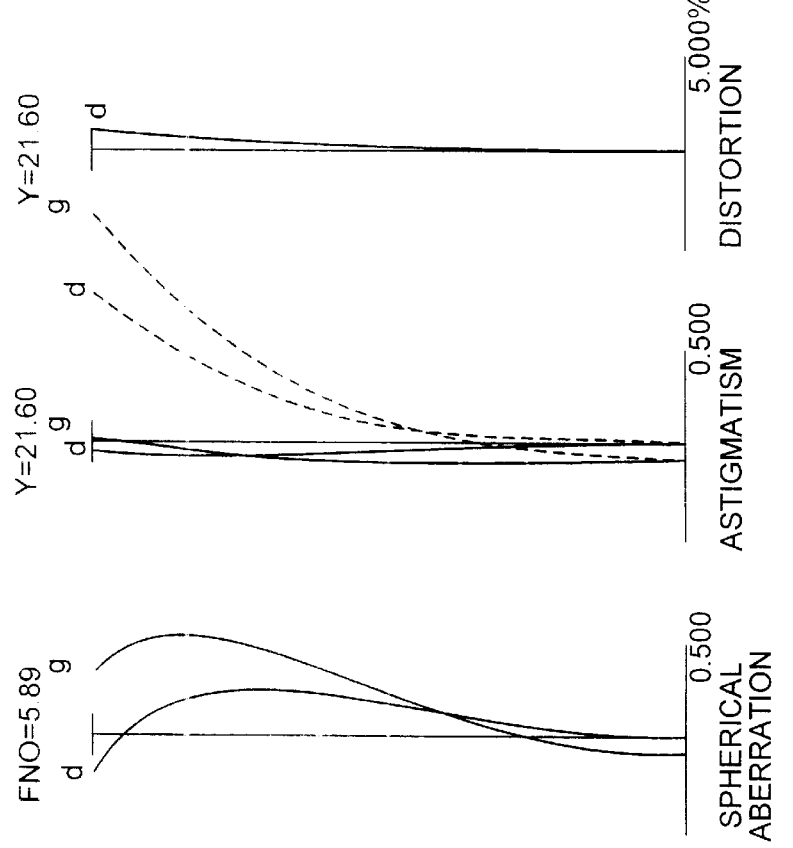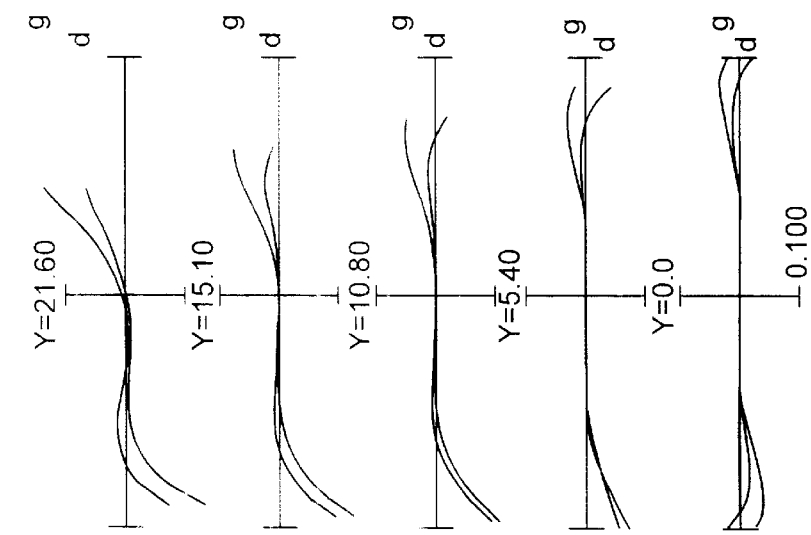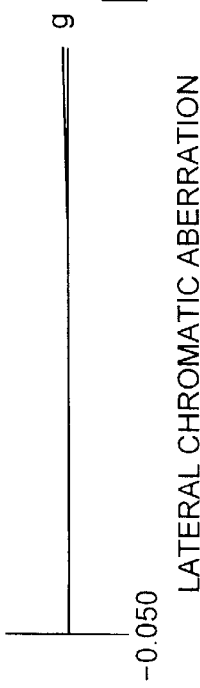

ZOOM LENS SYSTEM

INCORPORATION BY REFERENCE

The disclosures of the following priority applications are herein incorporated by reference:

Japanese Patent Application No. 11-343705 filed Dec. 2, 1999

Japanese Patent Application No. 2000-348664 filed Nov. 15, 2000.

BACKGROUND OF THE INVENTION

1. Field of the Invention

The present invention relates to a zoom lens system composed of a small number of lenses having very light weight and extremely reduced manufacturing cost and, more particularly, to an ultimately compact standard zoom lens system.

2. Description of Related Art

Recently, a standard lens attached to a single lens reflex camera has been replaced with a so-called standard zoom lens, and the trend has taken a firm hold on the customer as a lens in common use. Accordingly, it is indispensable condition that the standard zoom lens like this, which is always attached to a camera body while being moved around, is compact and lightweight, has sufficient imaging-forming performance, and is also inexpensive. In order to satisfy the condition, it is the most suitable for the standard zoom lens to be a two-unit zoom lens system consisting of a negative lens unit and a positive lens unit. Therefore, regarding this type of a zoom lens system, various lens arrangements have been proposed. Above all, a compact zoom lens with relatively fewer lens components is disclosed in Japanese Patent Application Laid-Open No. 56-43619. Japanese Patent Application Laid-Open No. 57-20713 discloses a zoom lens improved weight reducing and cost lowering by introducing a plastic lens element with an aspherical surface. Moreover, Japanese Patent Application Laid-Open No. 1-239516 discloses an example of a zoom lens with increased zoom ratio.

Although the zoom lens system disclosed in Japanese Patent Application Laid-Open No. 56-43619 has a relatively small number of lens elements, the zoom ratio about 1.9 is not a satisfactory specification as a current standard zoom lens. Moreover, the power arrangement of each lens unit is relatively loose, so that it has a zoom trajectory that the total lens length in the wide-angle state, which gives the shortest focal length, becomes excessively long. Accordingly, each lens element in the first lens unit having a negative refractive power is very large, so that it causes problems regarding the overall length and weight. Furthermore, glass materials used by respective lens elements in the first lens unit, which has the largest glass volume, are relatively expensive, so that it has been needed that the manufacturing cost is further lowered.

In the zoom lens system disclosed in Japanese Patent Application Laid-Open No. 57-20713 having a plastic lens element with an aspherical surface, the zoom ratio of 1.9 is not a satisfactory specification as a current standard zoom lens. Moreover, since the surface variation of a plastic lens with an aspherical surface, which is used in the zoom lens system, has been greatly affected by the temperature variation or the moisture absorption, there has been a problem on quality assurance as a photographic objective lens. Furthermore, since the manufacturing cost for processing a high precision plastic lens having processing of an aspherical surface liable to become higher than that of a polished glass lens using a small, cheep glass material, there is a problem of lowering the cost. Moreover, since the power arrangement of each lens unit is relatively loose, it has a zoom trajectory that the total lens length in the wide-angle state becomes excessively long. Accordingly, each lens element in the first lens unit having a negative refractive power is very large, so that it causes problems regarding the total lens length and weight. Furthermore, glass materials used by respective lens elements in the first lens unit, which has the largest glass volume, are relatively expensive, so that the manufacturing cost has been needed to be further lowered. Moreover, the number of lens elements comprising the second lens unit is large, so that further lowering the cost has been needed.

In the zoom lens system disclosed in Japanese Patent Application Laid-Open No. 1-239516, although the zoom ratio of the lens system has a sufficient value of 2.3, it is disadvantageous for the cost that the lens system uses eight lens elements, which is rather large number, and a lens with an aspherical surface. Furthermore, glass materials used by respective lens elements in the first lens unit, which has the largest glass volume, are relatively expensive and heavy, so that the manufacturing cost and the weight has been needed to be further lowered. Moreover, the number of lens elements comprising the second lens unit is large, so that further lowering the cost has been needed.

SUMMARY OF THE INVENTION

The present invention is made in view of the aforementioned problems and has an object to provide a zoom lens system being extremely reduced size such as a standard single focal length lens, having very few number of lens elements, being ultimately reduced cost, having a zoom ratio about 2.2, and also having high optical performance without using any aspherical surface.

According to one aspect of the present invention, a zoom lens system includes, in order from an object side, a first lens group having a negative refractive power and a second lens group having a positive refractive power. A zooming is performed by varying an air space between the first lens group and the second lens group. The first lens group comprises, in order from the object side, a negative lens group consisting of one or two negative lens elements and a positive lens element having a convex surface facing to the object side. All lens surfaces composing the first lens group are spherical or plane. The following conditional expressions (1) and (2) are satisfied:

$$1.4 \leq N_n \leq 1.621 \quad (1)$$

$$0.7 \leq |f_1|/(f_w \cdot f_t)^{1/2} \leq 1.15 \quad (2)$$

where $N_n$ denotes an average refractive index of the negative lens group within the first lens group for the d-line, $f_1$ denotes the focal length of the first lens group, $f_w$ denotes the focal length of the zoom lens system in a wide-angle state, which gives the shortest focal length, and $f_t$ denotes the focal length of the zoom lens system in a telephoto state, which gives the longest focal length.

In one preferred embodiment of the present invention, the first lens group consists of, in order from the object side, a negative lens group consisting of one or two negative lens elements and a positive lens element having a convex surface facing to the object side.

In one preferred embodiment of the present invention, the following conditional expression (3) is satisfied:

$$1.9 \leq SG \leq 4 \quad (3)$$

where SG denotes an average value of the specific gravity of each glass material composing the negative lens group within the first lens group consisting of one or two negative lens elements.

In one preferred embodiment of the present invention, the following conditional expression (4) is satisfied:

$$0.5 < f_2/f_w < 1.1 \quad (4)$$

where $f_2$ denotes the focal length of the second lens group.

In one preferred embodiment of the present invention, the following conditional expression (5) is satisfied:

$$0.693 < N_n \cdot f_w/f_t < 0.753 \quad (5).$$

According to another aspect of the present invention, a zoom lens system includes, in order from an object side, a first lens group having a negative refractive power and a second lens group having a positive refractive power. A zooming is performed by varying an air space between the first lens group and the second lens group. The first lens group comprises, in order from the object side, a negative lens group having one or two negative lens elements and a positive lens element consisting of a convex surface facing to the object side. The second lens group comprises, in order from the object side, two positive lens elements, a negative lens element, and a positive lens element. The following conditional expression (1) is satisfied;

$$1.4 \leq N_n \leq 1.621 \quad (1)$$

where $N_n$ denotes an average refractive index of the negative lens group within the first lens group for the d-line.

According to another aspect of the present invention, a zoom lens system includes, in order from an object side, a first lens group having a negative refractive power and a second lens group having a positive refractive power. A zooming is performed by varying an air space between the first lens group and the second lens group. The first lens group comprises, in order from the object side, a negative lens group consisting of one or two negative lens elements and a positive lens element having a convex surface facing to the object side. The second lens group comprises, in order from the object side, two positive lens elements, a negative lens element, and a positive lens element. The following conditional expression (3) is satisfied:

$$1.9 \leq SG \leq 4 \quad (3)$$

where SG denotes an average value of the specific gravity of each glass material composing the negative lens group within the first lens group consisting of one or two negative lens elements.

According to another aspect of the present invention, a zoom lens system includes, in order from an object side, a first lens group having a negative refractive power and a second lens group having a positive refractive power. A zooming is performed by varying an air space between the first lens group and the second lens group. The first lens group comprises, in order from the object side, a negative lens group consisting of one or two negative lens elements and a positive lens element having a convex surface facing to the object side wherein all lens surfaces composing the first lens group are spherical or plane. The following conditional expressions (2) is satisfied:

$$0.7 \leq |f_1|/(f_w \cdot f_t)^{1/2} \leq 1.15 \quad (2)$$

where $f_1$ denotes the focal length of the first lens group, $f_w$ denotes the focal length of the zoom lens system in a wide-angle state, which gives the shortest focal length, and $f_t$ denotes the focal length of the zoom lens system in a telephoto state, which gives the longest focal length.

BRIEF DESCRIPTION OF THE DRAWINGS

FIGS. 1A, 1B, and 1C are drawings showing the lens arrangement of a zoom lens system according to a first embodiment of the present invention, together with the movement of each lens group during zooming.

FIGS. 2A–2E graphically show various aberrations of the zoom lens system according to the first embodiment in the wide-angle state when the lens system is focused at infinity.

FIGS. 3A–3E graphically show various aberrations of the zoom lens system according to the first embodiment in the intermediate focal length state when the lens system is focused at infinity.

FIGS. 4A–4E graphically show various aberrations of the zoom lens system according to the first embodiment in the telephoto state when the lens system is focused at infinity.

FIGS. 6A–6E graphically show various aberrations of the zoom lens system according to the second embodiment in the wide-angle state when the lens system is focused at infinity.

FIGS. 7A–7E graphically show various aberrations of the zoom lens system according to the second embodiment in the intermediate focal length state when the lens system is focused at infinity.

FIGS. 8A–8E graphically show various aberrations of the zoom lens system according to the second embodiment in the telephoto state when the lens system is focused at infinity.

FIGS. 9A–9C are drawings showing the lens arrangement of a zoom lens system according to a third embodiment of the present inventions together with the movement of each lens group during zooming.

FIGS. 10A–10E graphically show various aberrations of the zoom lens system according to the third embodiment in the wide-angle state when the lens system is focused at infinity.

FIGS. 11A–11E graphically show various aberrations of the zoom lens system according to the third embodiment in the intermediate focal length state when the lens system is focused at infinity.

FIGS. 12A–12E graphically show various aberrations of the zoom lens system according to the third embodiment in the telephoto state when the lens system is focused at infinity.

DESCRIPTION OF THE PREFERRED EMBODIMENTS

Figure 5A:
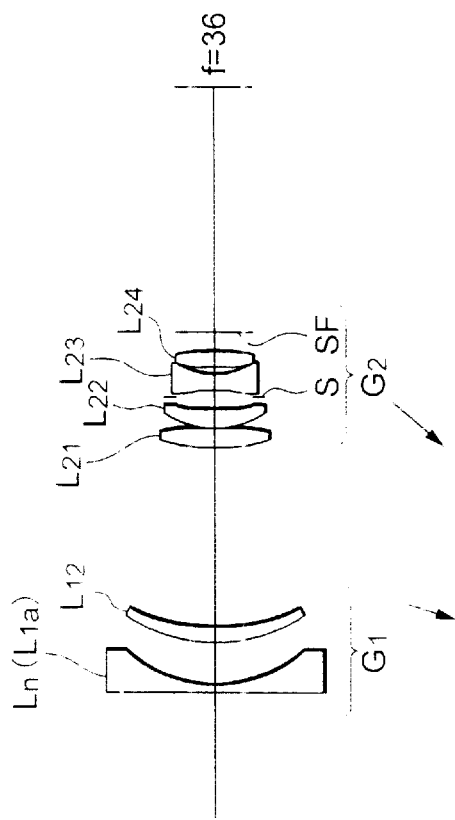
FIGS. 5A–5C are drawings showing the lens arrangement of a zoom lens system according to a second embodiment of the present invention, together with the movement of each lens group during zooming.

A basic construction of a zoom lens system according to the present invention is explained. The main object of the present invention is drastically reducing dimension, diameter, and a price of a two-unit zoom lens system, which comprises a first lens group having a negative refractive power and a second lens group having a positive refractive power. In construction, a first lens group of the zoom lens system consists of three lens elements having spherical or plane surfaces only, which three lens elements are a negative meniscus lens having a convex surface facing to an object side, a negative lens, and a positive lens having a convex surface facing to the object side, two lens elements having spherical or plane surfaces only, which two lens elements are a negative meniscus lens having a convex surface facing to an object side and a positive lens having a convex surface facing to the object side, or the like.

In this construction, it is most important to suitably set a power arrangement in the first lens group and to suitably select glass materials of the negative lenses in the first lens group. In order to aim at drastic reduction in dimension and cost like the present invention, it is necessary to reduce the dimension, weight, diameter, and thickness of the first lens group, and to reduce the moving amount of the first lens group while zooming by making the refractive power of the first lens group stronger. It is advantageous that the cost of the glass material and the lens tube material can be lowered. In order to perform ultimate reduction in weight and cost, it is necessary that the glass material of each negative lens in the first lens group, which has the largest volume in all lens groups in the zoom lens system, is selected to be as cheap as possible and has as small as possible specific gravity. Particularly, it is preferable that the glass material of each lens in the first lens group is a material having relatively low refractive index and small specific gravity, which does not include lanthanum such as borosillicate crown (BK), crown (K), and dense crown (SK), because it is the best choice for light weight and low cost. Moreover, if an aspherical lens is used in the first lens group, it causes cost up in comparison with all spherical lens system. In order to accomplish an ultimate reduction of the cost, it is meaningful that each surface of all lens elements is constructed by a spherical surface or a planer surface.

Conditional expressions according to the present invention will be explained below. Conditional expression (1) defines an appropriate range of an average value of refractive index of each lens, for d line, included in the negative lens group consisting of one or two negative lens element, which is included in the first lens group. As described above, the selection of glass materials is the most effective for reducing weight and lowering cost of the zoom lens system. Among the optical glass materials which are currently available, the optical glass materials within the range of refractive index corresponding to conditional expression (1) are those which are the cheapest and have the lowest specific gravity (lightest in weight). Accordingly, when the value exceeds the upper limit of conditional expression (1), the cost for the glass material becomes high, the weight becomes remarkably heavy, and, as a result, the compactness, light weight, and low cost cannot be accomplished, so that the merit for users goes down. Moreover, the upper limit of conditional expression (1) is desirably set lower than 1.6, more preferably lower than 1.55, which makes it possible to accomplish great reduction of weight and cost.

On the other hand, when the value falls below the lower limit of conditional expression (1), since the refractive index becomes too low, Petzval sum cannot be maintained within an appropriate value, and, as a result, it becomes difficult to correct especially off-axis aberrations. As a result, it causes drawbacks such that the number of lens element increases and that the wide zoom ratio cannot be maintained. Therefore, it is not desirable. The maximum effect of the present invention can be shown when the lower limit of conditional expression (1) is set to be larger than 1.49, more preferably larger than 1.5.

Then, conditional expression (2) is explained. Conditional expression (2) defines an appropriate range of the refractive power of the first lens group G1. In a two-unit zoom lens system in general, when the following expression is satisfied, which means that the ratio $|f_1|/(f_w \cdot f_t)^{1/2}$ is equal to one, the total lens length in the wide-angle state, which gives the shortest focal length, and in the telephoto state, which gives the longest focal length, becomes equal and the variation of the total lens length while zooming becomes minimum:

$$f_1 = -(f_w \cdot f_t)^{1/2}$$

where $f_1$ denotes the focal length of the first lens group G1, $f_w$ denotes the focal length of the whole lens system in the wide-angle state, and $f_t$ denotes the focal length of the whole lens system in the telephoto state. In order to accomplish the drastic reduction of dimension, diameter and cost, which is the main purpose of the present invention, it is not desirable to extremely depart from this expression.

Therefore, when the ratio exceeds the upper limit of conditional expression (2), the variation of the total lens length while zooming becomes large and the total lens length in the wide-angle state becomes maximum, and, as a result, it causes that the size of the first lens group and that of the filter increase, and that the weight increases. As a result, the drastic reduction of dimension, diameter and cost, which is the main purpose of the present invention, cannot be accomplished. Moreover, when the upper limit of conditional expression (2) is set to be smaller than 1.13, the further drastic reduction of dimension and diameter can be accomplished. Furthermore, the effect of the present invention can be fully shown when the upper limit of conditional expression (2) is set to be smaller than 1.1.

On the other hand, when the ratio falls below the lower limit of conditional expression (2), contrary to the case where the ratio exceeds the upper limit, the total lens length in the telephoto state becomes largest, and, as a result, the variation of the total lens length while zooming becomes too large as same as the case where the ratio exceeds the upper limit. Therefore, it is not desirable. Moreover, since the total lens length in the wide-angle state becomes minimum, it is effective to reduce the dimension and diameter of the first lens group. However, when the glass material satisfied with conditional expression (1) is used and all the surfaces of the first lens group comprise only spherical surface, it is undesirable that lower coma and distortion in the wide-angle state and spherical aberration and lower coma in the telephoto state become difficult to correct. Furthermore, the effect of the present invention can be fully shown when the lower limit of conditional expression (2) is set to be more than 0.8.

Then, conditional expression (3) is explained. Conditional expression (3) defines the average value of the specific gravity of each glass material used for the negative lens group consisting of one or two negative lens elements in the first lens group. Where the method for measuring the specific gravity is to be in accordance with the Nippon Kougaku-garasu-Kougyoukai Kikaku (Japan Optical Glass Industrial Standard). The fact that the specific gravity is light means that the weight of the same volume is relatively light, so that the cost for the material is also cheap, and, as a result, it has an effect of large reduction in cost. Accordingly, in the present invention, it is one of the important factors for developing an optical system with extremely reduced dimension, weight, and cost.

When the value SG exceeds the upper limit of conditional expression (3), the specific gravity becomes excessively heavy, so that it becomes difficult to accomplish an optical system with extremely reduced dimension, weight, and cost. Moreover, since a glass material with lanthanum is to be used, it may cause a factor to further increase manufacturing cost because of its processability, and the like.

On the other hand, when the value SG falls below the lower limit of conditional expression (3), there is no glass material and it means an use of a plastic material. As described before, the use of a plastic material introduces large variation in surface shape caused by variation in temperature and moisture absorption, so that optical performance as a photographic objective lens cannot be assured. Accordingly, the value SG is preferably within the range defined by conditional expression (3).

Moreover, it is preferable that the correction of aberrations can be performed by the minimum number of lens element by constructing the second lens group basically as an Ernoster type or a variation of a triplet type having four lens element arranged, in order from the object side, a positive lens, a positive lens, a negative lens, and a positive lens. Furthermore, when the main purpose of the object is to extremely reduce dimension, diameter, and cost like the present invention, it is preferable to arrange an aperture stop, in order from the object side, between the positive lens and the positive lens, or between the positive lens and the negative lens. In addition, the glass materials used in the second lens group are preferably reduced its cost to the utmost. Accordingly, it is preferable that the two positive lenses located to the object side use glass materials such as borosilicate crown (BK), crown (K), fluor crown (FK), or dense crown (SK), and that the refractive index is within the same area of the average refractive index defined by conditional expression (1). It is preferable that in the second lens group, the negative lens and the positive lens located to the object side use glass materials such as dense flint (SF), flint (F), light flint (LF), or extra light flint (LLF) because of the same reason described above. In aforementioned description, symbols in parentheses such as BK, or the like are code names used by Schott Glas and other companies.

When the following conditional expression (4) is satisfied, the effect of the present invention can be fully shown:

$$0.5 < f_2/f_w < 1.1 \qquad (4)$$

where $f_2$ denotes the focal length of the second lens group.

When the ratio $f_2/f_w$ exceeds the upper limit of conditional expression (4), since the refractive power of the second lens group becomes excessively weak, the variation in the total lens length while zooming increases and the back focal length increases, so that it is undesirable that the total lens length tends to become large. Moreover, it is effective for reducing dimension and diameter to set the upper limit of conditional expression (4) to be smaller than 1.05.

On the other hand, when the ratio falls below the lower limit of conditional expression (4), since the refractive power of the second lens group becomes excessively strong, although it is effective for reducing dimension, it is difficult to correct aberrations, and, as a result, it is undesirable that the variation in the spherical aberration and the upper coma become worse. Moreover, the back focal length becomes too short to use for a single lens reflex camera.

When the following conditional expression (5) is satisfied, the effect of the present invention can be fully shown:

$$0.693 < N_n \cdot f_w/f_t < 0.753 \qquad (5).$$

When the value $N_n \cdot f_w/f_t$ exceeds the upper limit of conditional expression (5), the average refractive index of the negative lens elements in the first lens group substantially increases, so that the cost for the glass materials increases and the weight also increases. Moreover, the focal length in the wide-angle state becomes longer, so that the specification becomes discontented. Therefore, the purpose of the present invention cannot be accomplished.

On the other hand, when the value falls below the lower limit of conditional expression (5), Petzval sum cannot maintain within a proper value, so the correction of aberrations becomes very difficult. Moreover, the focal length in the wide-angle state becomes too short, so that good optical performance becomes difficult to maintain under the scope of the present invention. Accordingly, in order to accomplish the purpose of the present invention, the value is desirably set within the range described above.

Numerical embodiments of zoom lens systems according to the present invention will be described below with reference to the attached drawings.

<First Embodiment>

FIGS. 1A, 1B, and 1C are drawings showing the lens arrangement of a zoom lens system according to a first embodiment of the present invention, together with the movement of each lens group during zooming.

In order from an object side, a first lens group G1 having a negative refractive power, and a second lens group G2 having a positive refractive power. The first lens group G1 has a negative lens group $L_n$ located to the object side, which has, in order from the object side, a negative meniscus lens $L_{1a}$ having a convex surface facing to the object side, a double concave lens $L_{1b}$, and a positive meniscus lens $L_{12}$ having a convex surface facing to the object side. The second lens group G2 has, in order from the object side, a double convex lens $L_{21}$, an aperture stop S, a double convex lens $L_{22}$, a double concave lens $L_{23}$, a positive meniscus lens $L_{24}$ having a concave surface facing to the object side, and a fixed stop SF.

A zooming from the wide-angle to the telephoto is performed by moving the first and second lens groups such that the air space between the first lens group G1 and the second lens group G2 decreases. The focusing at a close distance is performed by moving the first lens group G1 to the object side.

Various values associated with the first embodiment are listed in the following Table 1. In Table 1, the number in the left most column denotes the surface number showing the order i of the lens surface R from the object side, $r_i$ denotes the radius of curvature of the lens surface $R_i$, $d_i$ denotes the space between the lens surfaces $R_i$ and $R_{i+1}$ along the optical axis, $n_i$ denotes the refractive index of the medium for d-line ($\lambda$=587.56 nm) between the lens surfaces $R_i$ and $R_{i+1}$, and $v_i$ denotes Abbe number of the medium between the lens surfaces $R_i$ and $R_{i+1}$. Moreover, f denotes the focal length, FNO denotes the F-number, and 2ω denotes an angle of view. Furthermore, in the following each embodiment, the same symbols as the first embodiment are used. In the variable interval data, D0 denotes a distance between an object and the first lens surface, d6 denotes a distance between the first lens group and the second lens group, d16 denotes a distance between the fixed stop located to the image side of the last lens surface and the image plane, and β denotes the magnification between the object and the image. Moreover, 1-pos, 2-pos, and 3-pos denote the wide-angle state, the intermediate focal length state, and the telephoto state, respectively, focusing at infinity. Furthermore, 4-pos, 5-pos, and 6-pos denote the wide-angle state, the intermediate focal length state, and the telephoto state, respectively, with an imaging magnification of −1/30. Further, 7-pos, 8-pos, and 9-pos denote the wide-angle state, the intermediate focal length state, and the telephoto state, respectively, focusing at a close distance.

Moreover, in the following each embodiment, "mm" is generally used for the unit of length of the focal length f, radius of curvature r, space between surfaces d, or the like unless otherwise specified. However, since an optical system proportionally enlarged or reduced its dimension can be obtained similar optical performance, the unit is not necessary to be limited to "mm" and any other suitable unit can be used.

TABLE 1

(specification)
f = 36 to 77.6
2ω = 30.9° to 64.8°
FNO = 4.11 to 5.87

(lens data)

| i | r | d | ν | n | |
|---|---|---|---|---|---|
| 1) | 29.9203 | 1.6000 | 64.10 | 1.516800 | |
| 2) | 15.7380 | 8.0000 | | 1.000000 | |
| 3) | −255.1656 | 1.5000 | 64.10 | 1.516800 | |
| 4) | 29.1813 | 1.9500 | | 1.000000 | |
| 5) | 22.5979 | 3.3000 | 33.75 | 1.648311 | |
| 6) | 43.1243 | d6 | | 1.000000 | |
| 7) | 27.1438 | 3.5000 | 64.10 | 1.516800 | |
| 8) | −64.2734 | 1.0000 | | 1.000000 | |
| 9) | | 0.5000 | | 1.000000 | aperture stop S |
| 10) | 20.7202 | 5.0500 | 64.10 | 1.516800 | |
| 11) | −5270.4666 | 0.8000 | | 1.000000 | |
| 12) | −42.1766 | 3.5500 | 27.61 | 1.755200 | |
| 13) | 20.5018 | 1.4000 | | 1.000000 | |
| 14) | −166.1397 | 2.7000 | 28.19 | 1.740000 | |
| 15) | −25.5209 | 3.0000 | | 1.000000 | |
| 16) | | d16 | | 1.000000 | fixed stop SF |

(variable distance data)

| | 1-POS | 2-POS | 3-POS |
|---|---|---|---|
| f | 36.00000 | 50.00000 | 77.60000 |
| D0 | ∞ | ∞ | ∞ |
| d6 | 26.39918 | 13.13282 | 0.99969 |
| d16 | 45.01049 | 55.37483 | 75.80736 |

| | 4-POS | 5-POS | 6-POS |
|---|---|---|---|
| β | −0.03333 | −0.03333 | −0.03333 |
| D0 | 1027.7344 | 1159.5785 | 2207.5389 |
| d6 | 28.53251 | 23.14567 | 2.68257 |
| d16 | 45.01049 | 48.26400 | 74.12448 |

| | 7-POS | 8-POS | 9-POS |
|---|---|---|---|
| β | −0.12656 | −0.17578 | −0.27281 |
| D0 | 232.1795 | 232.1795 | 232.1795 |
| d6 | 34.49918 | 21.23282 | 9.09969 |
| d16 | 45.01049 | 55.37483 | 75.80736 |

FIGS. 2, 3, and 4 graphically show various aberrations of the zoom lens system according to the first embodiment in the wide-angle state, the intermediate focal length state, and the telephoto state, respectively, when the lens system is focused at infinity. As is apparent from the respective diagrams showing various aberrations, excellent compensation is made for the various aberrations. In the respective diagrams, FNO denotes the F-number, Y denotes an image height, and d and g denote aberrations for d-line and g-line, respectively. In the diagrams showing astigmatism, a solid line indicates a sagittal image plane and a broken line indicates a meridional image plane. In the aberration diagrams of the following each embodiment, the same symbols used in this embodiment are used.

<Second Embodiment>

Figure 5B:
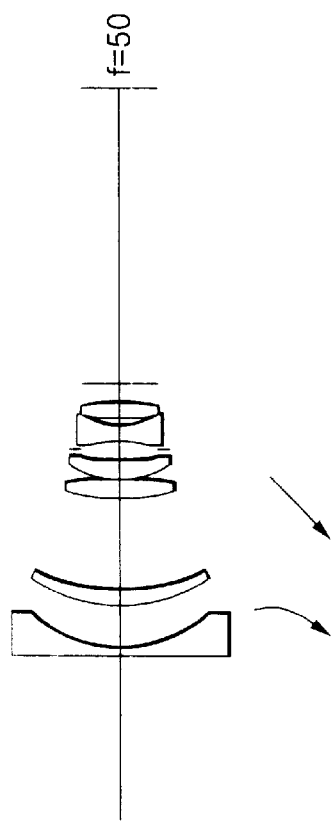
Figure 5C:
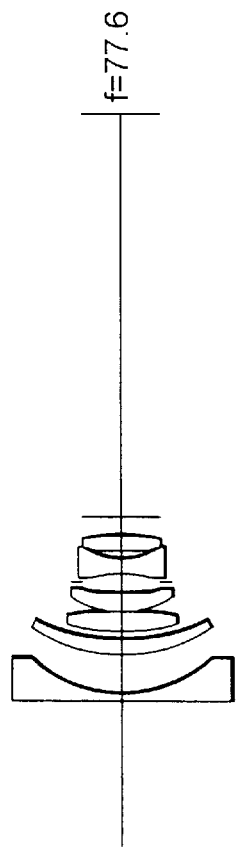

FIGS. 5A, 5B, and 5C are drawings showing the lens arrangement of a zoom lens system according to a second embodiment of the present invention, together with the movement of each lens group during zooming.

In order from an object side, a first lens group G1 having a negative refractive power, and a second lens group G2 having a positive refractive power. The first lens group G1 has a negative lens group $L_n$ located to the object side, which has a negative meniscus lens $L_{1a}$ having a convex surface facing to the object side, and a positive meniscus lens $L_{12}$ having a convex surface facing to the object side. The second lens group G2 has, in order from the object side, a double convex lens $L_{21}$, a positive meniscus lens $L_{22}$ having a convex surface facing to the object side, an aperture stop S, a double concave lens $L_{23}$, a double convex lens $L_{24}$, and a fixed stop SF.

Zooming from the wide-angle to the telephoto is performed by moving the first and second lens groups such that the air space between the first lens group G1 and the second lens group G2 decreases. The focusing at a close distance is performed by moving the first lens group G1 to the object side.

Various values associated with the second embodiment are listed in following Table 2.

TABLE 2

(specification)
f = 36 to 77.6
2ω = 30.8° to 65.6°
FNO = 4.1 to 5.9

(lens data)

| i | r | d | ν | n | |
|---|---|---|---|---|---|
| 1) | 309.1941 | 1.6000 | 60.14 | 1.620409 | |
| 2) | 20.5712 | 6.6000 | | 1.000000 | |
| 3) | 23.1461 | 2.5000 | 31.08 | 1.688930 | |
| 4) | 31.9213 | d4 | | 1.000000 | |
| 5) | 21.0311 | 3.5000 | 64.10 | 1.516800 | |
| 6) | −80.1103 | 0.1000 | | 1.000000 | |
| 7) | 16.6780 | 3.0000 | 70.41 | 1.487490 | |
| 8) | 64.7388 | 1.0000 | | 1.000000 | |
| 9) | | 1.0000 | | 1.000000 | aperture stop S |
| 10) | −68.8344 | 3.2500 | 29.46 | 1.717360 | |
| 11) | 14.7456 | 1.5000 | | 1.000000 | |
| 12) | 98.6534 | 2.0000 | 28.19 | 1.740000 | |
| 13) | −44.2911 | 3.0000 | | 1.000000 | |
| 14) | | d14 | | 1.000000 | fixed stop SF |

(variable distance data)

| | 1-POS | 2-POS | 3-POS |
|---|---|---|---|
| f | 36.00000 | 50.00000 | 77.60000 |
| D0 | ∞ | ∞ | ∞ |
| d4 | 30.15666 | 14.92778 | 0.99974 |
| d14 | 41.43898 | 50.50080 | 68.36552 |

| | 4-POS | 5-POS | 6-POS |
|---|---|---|---|
| β | −0.03333 | −0.03333 | −0.03333 |
| D0 | 1025.0838 | 1445.0841 | 2273.0828 |
| d4 | 32.95758 | 16.94444 | 2.29914 |
| d14 | 41.43941 | 50.50122 | 68.36594 |

| | 7-POS | 8-POS | 9-POS |
|---|---|---|---|
| β | −0.07140 | −0.09917 | −0.15392 |
| D0 | 449.2492 | 449.2492 | 449.2492 |
| d4 | 36.15666 | 20.92778 | 6.99974 |
| d14 | 41.44092 | 50.50454 | 68.37454 |

FIGS. 6, 7, and 8 graphically show various aberrations of the zoom lens system according to the second embodiment in the wide-angle state, the intermediate focal length state, and the telephoto state, respectively, when the lens system is focused at infinity. As is apparent from the respective diagrams showing various aberrations, excellent compensation is made for the various aberrations.

<Third Embodiment>

FIGS. 9A, 9B, and 9C are drawings showing the lens arrangement of a zoom lens system according to a third embodiment of the present invention, together with the movement of each lens group during zooming.

In order from an object side, a first lens group G1 having a negative refractive power, and a second lens group G2 having a positive refractive power. The first lens group G1 has a negative lens group $L_n$ located to the object side, which has, in order from the object side, a negative meniscus lens $L_{1a}$ having a convex surface facing to the object side, a plano-concave lens $L_{1b}$, and a positive meniscus lens $L_{12}$ having a convex surface facing to the object side. The second lens group G2 has, in order from the object side, a double convex lens $L_{21}$, an aperture stop S, a double convex lens $L_{22}$, a double concave lens $L_{23}$, a positive meniscus lens $L_{24}$ having a concave surface facing to the object side, and a fixed stop SF.

Zooming from the wide-angle to the telephoto is performed by moving the first and second lens groups such that the air space between the first lens group G1 and the second lens group G2 decreases. The focusing at a close distance is performed by moving the first lens group G1 to the object side.

Various values associated with the third embodiment are listed in following Table 3.

TABLE 3

(specification)
f = 36 to 77.6
2ω = 30.9° to to 64.8°
FNO = 4.04 to 5.89

(lens data)

| i | r | d | ν | n | |
|---|---|---|---|---|---|
| 1) | 28.5225 | 1.6000 | 64.10 | 1.516800 | |
| 2) | 15.5633 | 8.0000 | | 1.0 | |
| 3) | ∞ | 1.5000 | 64.10 | 1.516800 | |
| 4) | 26.0493 | 1.9500 | | 1.0 | |
| 5) | 21.0360 | 3.3000 | 33.75 | 1.648311 | |
| 6) | 36.8972 | d6 | | 1.0 | |
| 7) | 23.2886 | 3.5000 | 64.10 | 1.516800 | |
| 8) | −53.7555 | 1.0000 | | 1.0 | |
| 9) | ∞ | 0.5000 | | 1.0 | aperture stop S |
| 10) | 25.4683 | 5.0500 | 64.10 | 1.516800 | |
| 11) | −319.8102 | 0.8000 | | 1.0 | |
| 12) | −28.1100 | 3.5500 | 27.61 | 1.755200 | |
| 13) | 23.8767 | 1.4000 | | 1.0 | |
| 14) | −90.0174 | 2.7000 | 28.19 | 1.740000 | |
| 15) | −21.2045 | 3.0000 | | 1.0 | |
| 16) | | d16 | 1.0 | | fixed stop SF |

(variable distance data)

| | 1-POS | 2-POS | 3-POS |
|---|---|---|---|
| f | 36.00000 | 50.00000 | 77.60000 |
| D0 | ∞ | ∞ | ∞ |
| d6 | 26.39915 | 13.13279 | 0.99966 |
| d16 | 45.08073 | 55.44507 | 75.87760 |

| | 4-POS | 5-POS | 6-POS |
|---|---|---|---|
| β | −0.03333 | −0.03333 | −0.03333 |
| D0 | 1027.7344 | 1159.5785 | 2207.5389 |
| d6 | 28.53248 | 23.14564 | 2.68254 |
| d16 | 45.08008 | 48.33359 | 74.19407 |

TABLE 3-continued (specification)
f = 36 to 77.6
2ω = 30.9° to to 64.8°
FNO = 4.04 to 5.89

| | 7-POS | 8-POS | 9-POS |
|---|---|---|---|
| β | −0.12656 | −0.17578 | −0.27281 |
| D0 | 232.1795 | 232.1795 | 232.1795 |
| d6 | 34.49915 | 21.23279 | 9.09966 |
| d16 | 45.07138 | 55.42704 | 75.83419 |

FIGS. 10, 11, and 12 graphically show various aberrations of the zoom lens system according to the third embodiment in the wide-angle state, the intermediate focal length state, and the telephoto state, respectively, when the lens system is focused at infinity. As is apparent from the respective diagrams showing various aberrations, excellent compensation is made for the various aberrations.

Values for above conditional expressions in accordance with each embodiment are shown in the following Table 4.

TABLE 4

| Embodiment | First | Second | Third |
|---|---|---|---|
| f1 | −48.00000 | −55.00000 | −48.00000 |
| f2 | 35.53481 | 35.60000 | 35.53481 |
| (1) $N_n$ | 1.5168 | 1.62041 | 1.5168 |
| (2) $|f_1|/(f_w \cdot f_t)^{1/2}$ | 0.908 | 1.041 | 0.908 |
| (3) SG | 2.52 | 3.58 | 2.52 |
| (4) $f_2/f_w$ | 0.987 | 0.989 | 0.987 |
| (5) $N_n \cdot f_w/f_t$ | 0.704 | 0.752 | 0.704 |

As described above, the present invention makes it possible to provide a zoom lens system having an angle of view 2ω=30.9° to 64.8° and the zoom ratio about 2.2, which has extremely light weight, compact size, and good cost performance.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A zoom lens system comprising, in order from an object side:

a first lens group having a negative refractive power; and a second lens group having a positive refractive power;

wherein a zooming is performed by varying an air space between the first lens group and the second lens group;

wherein the first lens group comprises, in order from the object side, a negative lens group consisting of one or two negative lens elements and a positive lens element having a convex surface facing to the object side;

wherein all lens surfaces composing the first lens group are spherical or plane; and wherein the following conditional expressions (1) and (2) are satisfied;

$$1.4 \leq N_n \leq 1.621 \tag{1}$$

$$0.7 \leq |f_1|/(f_w \cdot f_t)^{1/2} \leq 1.15 \tag{2}$$

where
- $N_n$ denotes an average refractive index of the negative lens group within the first lens group for the d-line,
- $f_1$ denotes the focal length of the first lens group,
- $f_w$ denotes the focal length of the zoom lens system in a wide-angle state, which gives the shortest focal length, and
- $f_t$ denotes the focal length of the zoom lens system in a telephoto state, which gives the longest focal length.

2. The zoom lens system according to claim 1, wherein the following conditional expression (3) is satisfied:

$$1.9 \leq SG \leq 4 \qquad (3)$$

where SG denotes an average value of the specific gravity of each glass material composing the negative lens group within the first lens group consisting of one or two negative lens elements.

3. The zoom lens system according to claim 2, wherein the following conditional expression (4) is satisfied:

$$0.5 < f_2/f_w < 1.1 \qquad (4)$$

where $f_2$ denotes the focal length of the second lens group.

4. The zoom lens system according to claim 3, wherein the following conditional expression (5) is satisfied:

$$0.693 < N_n \cdot f_w/f_t < 0.753 \qquad (5).$$

5. The zoom lens system according to claim 2, wherein the following conditional expression (5) is satisfied:

$$0.693 < N_n \cdot f_w/f_t < 0.753 \qquad (5).$$

6. The zoom lens system according to claim 1, wherein the following conditional expression (4) is satisfied:

$$0.5 < f_2/f_w < 1.1 \qquad (4)$$

where $f_2$ denotes the focal length of the second lens group.

7. The zoom lens system according to claim 6, wherein the following conditional expression (5) is satisfied:

$$0.693 < N_n \cdot f_w/f_t < 0.753 \qquad (5).$$

8. A zoom lens system comprising, in order from an object side:
- a first lens group having a negative refractive power; and
- a second lens group having a positive refractive power;
- wherein a zooming is performed by varying an air space between the first lens group and the second lens group;
- wherein
  - the first lens group comprises, in order from the object side,
    - a negative lens group consisting of one or two negative lens elements, and
    - a positive lens element having a convex surface facing to the object side; and
  - the second lens group comprises, in order from the object side,
    - two positive lens elements,
    - a negative lens element, and
    - a positive lens element; and
- wherein the following conditional expression (1) is satisfied;

$$1.4 \leq N_n \leq 1.621 \qquad (1)$$

where $N_n$ denotes an average refractive index of the negative lens group within the first lens group for the d-line.

9. The zoom lens system according to claim 8, wherein the following conditional expression (4) is satisfied:

$$0.5 < f_2/f_w < 1.1 \qquad (4)$$

where $f_2$ denotes the focal length of the second lens group.

10. The zoom lens system according to claim 9, wherein the following conditional expression (5) is satisfied:

$$0.693 < N_n \cdot f_w/f_t < 0.753 \qquad (5).$$

11. The zoom lens system according to claim 8, wherein the following conditional expression (5) is satisfied:

$$0.693 < N_n \cdot f_w/f_t < 0.753 \qquad (5).$$

12. A zoom lens system comprising, in order from an object side:
- a first lens group having a negative refractive power; and
- a second lens group having a positive refractive power;
- wherein a zooming is performed by varying an air space between the first lens group and the second lens group;
- wherein
  - the first lens group comprises, in order from the object side,
    - a negative lens group consisting of one or two negative lens elements, and
    - a positive lens element having a convex surface facing to the object side; and
  - the second lens group comprises, in order from the object side,
    - two positive lens elements,
    - a negative lens element, and
    - a positive lens element; and
- wherein the following conditional expression (3) is satisfied:

$$1.9 \leq SG \leq 4 \qquad (3)$$

where SG denotes an average value of the specific gravity of each glass material composing the negative lens group within the first lens group consisting of one or two negative lens elements.

13. The zoom lens system according to claim 12, wherein the following conditional expression (2) is satisfied:

$$0.7 \leq |f_1|/(f_w \cdot f_t)^{1/2}b \leq 1.15 \qquad (2)$$

where
- $f_1$ denotes the focal length of the first lens group,
- $f_w$ denotes the focal length of the zoom lens system in a wide-angle state, which gives the shortest focal length, and
- $f_t$ denotes the focal length of the zoom lens system in a telephoto state, which gives the longest focal length.

14. The zoom lens system according to claim 13, wherein the following conditional expression (4) is satisfied:

$$0.5 < f_2/f_w < 1.1 \qquad (4)$$

where $f_2$ denotes the focal length of the second lens group.

15. The zoom lens system according to claim 14, wherein the following conditional expression (5) is satisfied:

$$0.693 < N_n \cdot f_w / f_t < 0.753 \quad (5).$$

16. The zoom lens system according to claim 13, wherein the following conditional expression (5) is satisfied:

$$0.693 < N_n \cdot f_w / f_t < 0.753 \quad (5).$$

17. The zoom lens system according to claim 12, wherein the following conditional expression (4) is satisfied:

$$0.5 < f_2 / f_w < 1.1 \quad (4)$$

where $f_2$ denotes the focal length of the second lens group.

18. The zoom lens system according to claim 17, wherein the following conditional expression (5) is satisfied:

$$0.693 < N_n \cdot f_w / f_t < 0.753 \quad (5).$$

* * * * *